June 13, 1933.   H. HOBI   1,914,016
APPARATUS FOR CLEANSING AND STERILIZING
THE DISKS OF CENTRIFUGAL SEPARATORS
Filed July 29, 1932

INVENTOR.
Henry Hobi
BY
W. F. Woodard
ATTORNEY.

Patented June 13, 1933

1,914,016

UNITED STATES PATENT OFFICE

HENRY HOBI, OF HORICON, WISCONSIN

APPARATUS FOR CLEANSING AND STERILIZING THE DISKS OF CENTRIFUGAL SEPARATORS

Application filed July 29, 1932. Serial No. 626,184.

The present invention relates to means designed for the speedy cleansing and sterilizing of the disks used in a centrifugal separator, with particular application to such disks as are used in cream separation.

The invention resides in an automatically operating apparatus, by means of which all of the disks constituting a stack or set, are cleansed simultaneously in a tank containing hot water, in which the disks are sterilized by a jet of steam projected tangentially against the periphery thereof. The disks are loosely mounted and supported on a rack which is supported on a tubular shaft, which in turn is maintained in an inclined position, so that the stack of disks revolving with the rack under the pressure of the steam, gradually travels lengthwise along the supporting shaft for the rack, whereby the discs are subjected to constant washing by the water and to the sterilizing action of the steam, all in a single operation, thus effecting a great saving in the time normally required for this work.

The inclined tubular shaft upon which the rack carrying the stack of disks is mounted for free rotation, is pivoted at one end, so that the loose end of such support may be lifted or raised out of the tank, to permit the easy insertion and removal of the rack. Such tubular shaft is perforated, to permit the escape of steam at the inside of the stack of disks, and thus augment the sterilizing action of the jet of steam upon the periphery of the disks.

Having thus outlined the nature and purposes of my invention, I will now describe the construction shown in the drawing, and will point out the novelty of the apparatus, in the appended claims.

Figure 1:
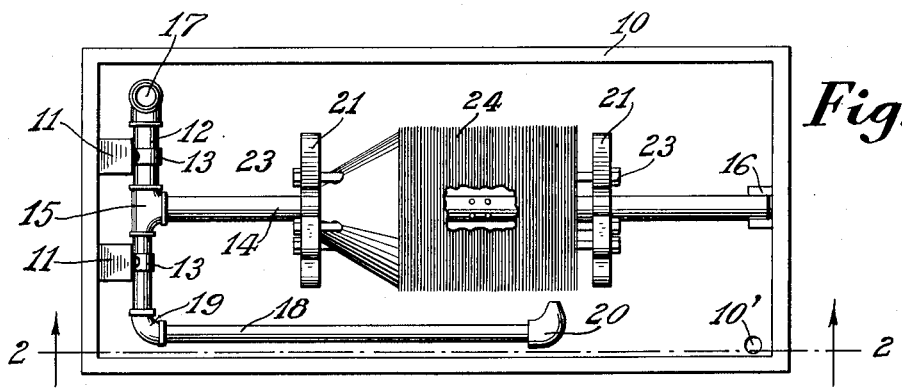
Figure 1 is a plan view of the apparatus embodying my invention, some of the disks being broken out, to show the steam emission ports in the tubular supporting shaft.

In the drawing, the numeral 10 indicates a tank of suitable dimensions, constructed so as to hold a quantity of water, and provided with a draining outlet 10'.

Spaced pillow blocks 11, 11, are attached to the inside of one end of the tank, so as to stand vertically. Upon these pillow blocks, a horizontally disposed tubular cross-head 12 is journaled, and held in rotating position thereon by straps 13, attached to the pillow blocks.

Figure 2:
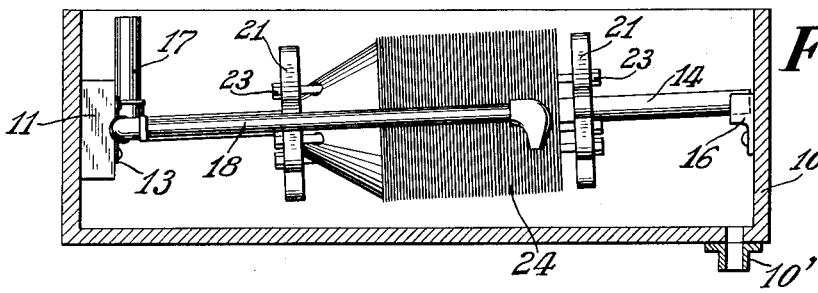
Fig. 2 is a view in side elevation, taken on the line 2—2, Fig. 1, and looking in the direction of the arrows.

A tubular shaft 14, extending the length of the tank 10, is coupled to the cross-head 12 by means of a T 15, through which communication from the cross-head to the tubular shaft 14 is established. The free end of the tubular shaft 14 is adapted to rest upon a bracket 16, secured to the inner side of the opposite end of the tank. The said bracket 16 is attached at a point slightly above the plane in which the cross-head 12 is journaled upon the pillow blocks, so that said tubular shaft 14 is supported in an inclined position, as shown in Fig. 2.

Steam is admitted to the tubular cross-head 12 through a connection 17 at one end, and a conduit 18 is coupled to the other end of the tubular cross-head by means of an L 19. The free end of the conduit is provided with a nozzle 20, through which a jet of steam is adapted to be projected tangentially against the peripheries of the separator disks, when the latter are positioned with their supporting rack upon the tubular shaft 14.

The said tubular shaft 14 is provided with a considerable number of perforations which form emission ports, to permit the escape of the steam to the inside of the stack of disks, to assist in and increase the sterilizing operation.

Figure 3:
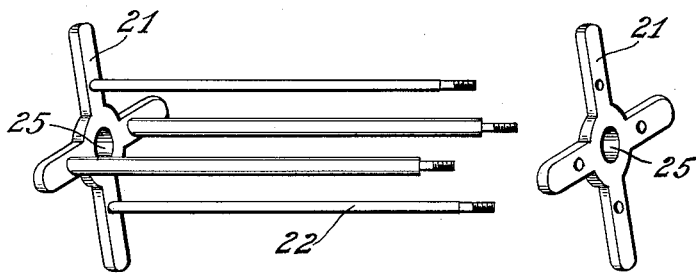
Fig. 3 is a perspective view of the rack upon which the disks are assembled, and by means of which they are supported during the cleansing and sterilizing operation.

The supporting rack is shown in perspective in Fig. 3, such rack comprising two removable heads or spiders 21, 21, and a plurality of tie-bars 22. The heads or spiders 21, in the present case, the arms of the spiders, are provided with perforations at the same radial distance, in which are received the reduced and shouldered ends of the tie-bars 22. The reduced ends of the tie-bars are threaded for the accommodation of nuts 23, which are applied to hold the parts in a position of assembly.

Each disk of the stack or set of disks 24, is provided with a plurality of perforations, and these are utilized to position the stack of disks upon the rack, by entering the tie-bars 22 therein. Only one head or spider needs to be removed. The stack or set of disks 24 is handled as a unit, which with the rack, may be easily placed in position upon the perforated tubular shaft 14, and as easily removed therefrom, when the loose end of the shaft is lifted clear of the tank. The heads or spiders 21, confining the stack of disks 24 between them, are centrally perforated as at 25, so as to provide bearings upon the shaft 14, at each end of the rack. The said heads may conveniently be in the form of circular plates.

The steam conduit 18 is extended at one side of and in parallelism with the tubular shaft 14, but the nozzle 20 at the free end of the conduit is positioned so as to direct a jet of steam tangentially against the peripheries of the disks, whereby the steam pressure will induce a rotation of the rack and the stack of disks supported thereby, upon the tubular shaft 14. The unit is first positioned at the elevated end of the tubular shaft 14, and as rotative movement is imparted to the same by the steam pressure, the unit gradually works itself downwardly along the shaft, until all of the disks have been subjected to the sterilizing action of the steam. In actual operation, all of the disks are subjected to protracted washing by the water in the tank, and at the same time are successively sterilized. The loose end of the tubular shaft 14 may be plugged to conserve the steam, and restrain its emission to the several orifices provided therefor, as described. The operation of bodily transferring the stack or set of disks from the separator to the rack, and returning the same to the separator, is easily accomplished.

The disks constituting the stack 24, are loosely held in the rack, so that a slight separation of the same from contact with each other, will occur in the rotation of the unit. This separation will permit the free circulation of the water and steam over the entire surfaces of the disks, and thus effect a thorough cleansing and sterilizing.

Having thus described my invention, what I claim and desire to secure by Letters Patent of the United States, is:

1. In an apparatus for cleansing and sterilizing the disks of a centrifugal separator, a receptacle, a supporting shaft mounted in the receptacle, a rack journaled for rotation upon the said shaft and supporting a stack or set of separator disks, and means for delivering a jet of sterilizing steam against the disks, in such direction as to rotate the latter during the washing operation, and means within said disks for directing steam against the interior thereof.

2. In an apparatus for cleansing and sterilizing the disks of a centrifugal separator, a receptacle, an inclined supporting shaft mounted in the receptacle, a rack for supporting a stack or set of disks journaled for rotation upon the said inclined shaft and adapted for downward travel therealong, and means for delivering a jet of sterilizing steam against the disks in such direction as to rotate the same.

3. In an apparatus for cleansing and sterilizing the disks of a centrifugal separator, a receptacle, a supporting tubular shaft provided with steam ports mounted in the receptacle, a rack journaled for rotation upon the said shaft and supporting a stack or set of separator disks, means for supplying steam to the tubular shaft, and means for delivering a jet of sterilizing steam against the disks, in such direction as to rotate the latter.

4. In an apparatus for cleansing and sterilizing the disks of a centrifugal separator, a receptacle, a supporting shaft hingedly mounted at one end in the receptacle, a rack journaled for rotation upon the said shaft and supporting a stack or set of separator disks, and means for delivering a jet of sterilizing steam against the disks in such direction as to rotate the latter.

5. In an apparatus for cleansing and sterilizing the disks of a centrifugal separator, a receptacle, an inclined supporting shaft hingedly mounted in the receptacle, a rack journaled for rotation and downward travel upon the said shaft and supporting a stack or set of separator disks, and means for delivering a jet of sterilizing steam against the disks in such direction as to rotate the same and thereby effect downward travel thereof during the washing operation.

6. In an apparatus for cleansing and sterilizing the disks of a centrifugal separator, a receptacle, an inclined tubular supporting shaft provided with steam ports hingedly mounted at one end in the receptacle, a rack journaled for rotation upon the said shaft and supporting a stack or set of disks, means for supplying steam to the tubular shaft, and means for delivering a jet of sterilizing steam against the disks in such direction as to rotate the same.

7. In an apparatus for cleansing and sterilizing the disks of a centrifugal separator, a receptacle, a tubular cross-head journaled in the receptacle at one end, an inclined tubular shaft attached to and communicating with the cross-head, the said inclined tubular shaft being provided with steam ports, a rack journaled for rotation and downward travel upon the tubular shaft and supporting a stack or set of separator disks, means for delivering steam to the cross-head, and means connected with the cross-head for delivering a jet of sterilizing steam against the disks in such direction as to rotate the same and thereby effect a downward travel thereof along said shaft.

In testimony whereof, I have signed my name at Horicon, this 17th day of September, 1931.

HENRY HOBI.